(12) United States Patent
Erlenborn et al.

(10) Patent No.: US 7,327,732 B2
(45) Date of Patent: Feb. 5, 2008

(54) METHOD AND APPARATUS FOR COMBINED FRAMING AND PACKET DELINEATION

(75) Inventors: Mark J Erlenborn, Naperville, IL (US); Jeff R. Gemar, Superior, CO (US); George Harper, Weston, MA (US); Kewei Yang, San Jose, CA (US); Welborn R Malpass, Evergreen, CO (US); Sam L Spencer, San Diego, CA (US); Keith A Kind, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1062 days.

(21) Appl. No.: 10/307,015

(22) Filed: Nov. 27, 2002

(65) Prior Publication Data
US 2004/0100992 A1 May 27, 2004

(51) Int. Cl.
*H04L 12/28* (2006.01)
*H04J 3/24* (2006.01)

(52) U.S. Cl. .................. 370/392; 370/395.1; 370/468; 370/474

(58) Field of Classification Search ............... 370/389, 370/392, 395.6, 464, 473, 474, 476, 395.1, 370/468
See application file for complete search history.

(56) References Cited

U.S. PATENT DOCUMENTS 6,130,895 A * 10/2000 Tannhauser ................. 370/468
6,188,692 B1 * 2/2001 Huscroft et al. ........ 370/395.51

* cited by examiner

*Primary Examiner*—Afsar Qureshi

(57) ABSTRACT

Incoming bit stream is processed by a single state machine into a circular buffer. Circular buffer accumulates subunits of data to form a major data unit. State machine recognizes the start of major data unit and flags the location of the major data unit in the circular buffer.

18 Claims, 5 Drawing Sheets

METHOD AND APPARATUS FOR COMBINED FRAMING AND PACKET DELINEATION

FIELD OF THE INVENTION

The invention relates generally to networks and, more particularly, is directed to a system for receiving delineated packets from a network medium.

BACKGROUND OF THE INVENTION

Various transfer protocols have evolved over the years. Many of these transfer protocols have adopted a layered perspective of a communications model. Layered models allow implementers to define communications services in an abstract manner. Such abstraction allows definition of varying levels of communication service between users. And because the lowest levels of communication models are used to define the management of a physical medium, abstract definitions of communication services may easily be ported to varying network types.

One popular communications model is the Open Systems Interconnect (OSI) protocol stack. The OSI protocol stack defines communication services in terms of seven distinct layers. Attachment to a physical medium is governed by a Layer 1 definition. The Layer 1 definition establishes requirements for attaching to a physical medium and describes the lowest level of communications service across that medium. Typically, this lowest level of communications service comprises transfer of information from one device to another using a physical address and a primitive data format. This Layer 1 definition is typically referred to as the physical, or "PHY" layer.

At the Layer 2 level of the OSI model, data packets are encoded and decoded into bits. Layer 2 embodies transmission protocol knowledge and management and handles errors in the physical layer, flow control and frame synchronization. Layer 2, which is also known as the data link layer, is divided into two sub-layers. The first sub-layer is often referred to as Media Access Control (MAC). The second Layer 2 sub-layer is the Logical Link Control (LLC) layer. The MAC sub-layer controls how a device on a network gains access to the data and obtains permission to transmit. The LLC layer controls frame synchronization, flow control and error checking. In many systems, the MAC sub-layer is tightly integrated with PHY layer.

Because Layer 1 and Layer 2 of the OSI model are so tightly integrated, hardware implementations of network interfaces typically combine PHY, MAC and LLC functionality into a single device. At the physical layer, a stream of digital bits representing data arrives at a network interface device. The physical layer may also define how digital bits are encoded when they are propagated over a communications medium. In one example system, digital information may be encoded using a non-return to zero encoding. In other systems, a 4B/5B (four data bits out of a 5 bit symbol) encoding process may be used to provide higher bandwidth with inherent clocking of data transferred across the medium.

The network interface device may construct packets of data that higher levels of the communications model can use to convey information. In a typical network interface device, the digital bits may be accumulated to form small building blocks. These may be used to construct the data packets used by the higher levels of the communications model. This is typically referred to as Layer 1 framing. In one known embodiment, Layer 1 framing results in packing sequentially arriving digital bits into 8-bit bytes. This Layer 1 framing function will typically comprise a method for determining the start of a data frame.

As the Layer 1 framing function assembles data bytes, they are typically assembled into data packets by a Layer 2 function called delineation. Layer 2 delineation may also entail error checking and/or correction capabilities that enable the detection/correction of bit errors in the assembled packet. The Layer 2 delineation function typically adheres to a particular data packet format that may comprise not only data, but an error checking and/or correction field as well.

The traditional wisdom in the design and implementation of network interface devices has typically called for the segregation of Layer 1 framing and Layer 2 delineation functionality. One reason for this is simplicity in design. By segregating these functions, one simple state machine could be used to accumulate arriving bits into data bytes. These are typically stored in a first data buffer. A second state machine then retrieves the data bytes from the first buffer and assembles them into data packets in a second buffer. Another motivation for maintaining the segregation is pipelining. As new data arrives in the first buffer, a previously assembled data packet could be extracted from the second data buffer.

One disadvantage to these segregated designs is the need for additional data buffering storage. One data buffer is typically needed for assembly of bytes from the serial bit stream arriving at the network interface device. Once all of the bytes were assembled, a second buffer memory is needed to assemble data packets. These duplicate resources are, in a word, wasteful. Twice the buffer memory means twice the silicon real-estate. This results in lower chip yields because a network interface device will comprise many more transistors that otherwise required. Another disadvantage of such conventional designs is that they require additional power for the second buffer memory.

SUMMARY OF THE INVENTION

The present invention comprises a method for receiving major data units from a bit stream. This method may be embodied in an apparatus that also comprises the invention. According to one example method of the present invention, a stream of bits from an interface is received into a state machine. According to one example embodiment of a method taught by the present invention, the arriving bit stream is encoded. Hence, the step of receiving a stream of bits may be comprised of receiving an encoded bit stream and then decoding the bit stream to form a non-encoded bit stream.

The state machine may search the bit stream in order to identify a start sequence. This may be done, for example, by sequencing through states of the state machine that correspond to the bits in a start sequence. When an incoming bit does not match the state of a bit that corresponds to a particular state in the state machine, the state machine is forced back to an initial state where it can search for the first bit in a start sequence.

The start sequence indicates the beginning of a subunit of data. Once a start sequence is recognized, a subunit of data may be extracted from the incoming bit stream by causing the state machine to accumulate a predetermined number of data bits and to store those in individually addressable memory locations comprising a data buffer. According to this example method, a major data unit that is received is typically fragmented into one or more subunits of data. The data subunits are stored in the data buffer in order to reconstruct a major data unit that may be used by higher levels of a communication protocol model.

As the bit stream is processed by the state machine, the present method provides for the extraction of data subunits and the storage of these into a single data buffer. In some embodiments, the state machine manipulates the data buffer both during accumulation of data subunits and as major data units are dispatched from the buffer. According to the present invention, accumulation of the data subunits that form a major data unit and the formation of the major data unit is performed in a single data buffer. In some embodiments, the method of the present invention manipulates the data buffer in a circular manner. In one alternative and illustrative method of the present invention, this may be accomplished by wrapping a read or write pointer back to the beginning of the data buffer if it is incremented beyond a wrapping boundary.

Because the method of the present invention receives data subunits in the same buffer wherein major data units are formed, it may be necessary to identify the beginning of a major data unit within the data buffer. There are many ways to accomplish this task. For example, in one alternative method of the present invention, identification of the beginning of a major data unit is accomplished by recognizing a predetermined encoding symbol in the encoded bit stream that is received by the state machine. In yet another alternative method of the present invention, the beginning of a major data unit is identified by recognizing a header section within the major data unit. In one alternative method of the present invention, some number of data subunits are used as the basis of an error code. An error code check value may then be received from the incoming bit stream and compared to the generated error code. Whenever the beginning of a major data unit is detected, the method of the present invention provides for storage of an offset value that corresponds to the location of the beginning of the major data unit within the data buffer.

In one illustrative embodiment of an apparatus according to the teachings of the present invention, a data-unit extractor may comprise an interface that receives a signal and generates a bit stream therefrom. The data-unit extractor may further comprise a state machine that receives a bit stream from the interface and searches for a start of frame sequence in the bit stream. Once the start of frame sequence is discovered, the state machine issues an acquisition signal that enables successive subunits of data to be received from the bit stream. In one embodiment of a data-unit extractor, a serial-to-parallel converter that may comprise the invention receives the bit stream from the interface and forms data subunits in response to the acquisition signal. The data-unit extractor may also comprise a decoder that receives an encoded serial bitstream and generates a non-encoded bit stream therefrom.

According to one illustrative embodiment of a data-unit extractor, the state machine generates a write signal that causes data subunits to be stored in a data buffer. The state machine may also generate additional control signals to control the formation of major data units from data subunits stored in the data buffer and for the transmission of major data units once they are assembled.

According to one example embodiment of a data-unit extractor, the state machine searches for the start of frame by transitioning through a sequence of states that correspond to the bits in a start sequence. The state machine continues to transition through successive states so long as the corresponding bit in the sequence is recognized. In the event that the wrong bit is received in the state machine in a particular machined state, the state machine reverts to an initial state wherein it is ready to recognize the first bit and the start sequence. Once the start sequence is recognized, one embodiment of the present invention comprises a state machine that generates an acquisition signal in a manner that enables the acquisition of the predetermined number of bits as a subunit of data. Accordingly, the state machine will enable a write signal once the predetermined number of bits have been acquired.

In one alternative embodiment of a data-unit extractor, the state machine manages the data buffer in a circular manner. The state machine enables a write address pointer that defines the storage location within the data buffer that will accept the next subunit of data that may be received. After a subunit of data has been stored in the data buffer according to this address pointer, the address pointer is incremented so long as the incremented write address pointer does not violate a wrapping boundary comprising the data buffer. If incrementing the write address pointer will cause the write address pointer to point beyond the wrapping boundary, the write address pointer will be set to the beginning of the data buffer.

In order to identify the beginning of a major data unit within the data buffer, some embodiments of the data-unit extractor may recognize a particular encoding signal peculiar to the beginning of a major data unit. In some embodiments, the encoding signal may carry multi-bit symbols. Some multi-bit symbols may be used to convey bits of data while others may be used for special purposes such as indicating the beginning of a major data unit.

In one example embodiment of a data-unit extractor, the beginning of a major data unit may be identified by recognizing a header within the major data unit. In such alternative embodiments of a data-unit extractor, the invention may comprise an error accumulator. The error accumulator may receive a number of subunits of data at the direction of the state machine. The state machine may also direct the error accumulator to generate an error code based on these subunits of data. The state machine may also direct an error code check value that may be received from the interface to the error accumulator. The error accumulator may also compare the error code check value to the generated error code. In the event of a match, the error accumulator may issue a match signal that is indicative of the beginning of a major data unit.

According to one illustrative embodiment of a data-unit extractor, identification of a major data unit within the data buffer causes the address of the major data unit within the data buffer to be stored in a read address pointer. In order to transmit a major data unit from the data buffer, the state machine may enable the read address pointer onto the data buffer and extract a subunit of a data therefrom. With the dispatch of each successive subunit of data, the read address pointer is incremented so long as the incremented read address pointer does not violate a wrapping boundary comprising the data buffer. In the event that the read address pointer breaches the wrapping boundary, it is reset so that it points to the beginning of the data buffer.

In one example implementation, the present invention comprises an apparatus for extracting ATM cells from a stream of data. In the case of ATM cells, the apparatus receives subunits of data into the circular buffer and may identify the beginning of ATM cells either through recognition of an ATM cell header or by means of a special encoding symbol received at the interface of the device. Once the beginning of an ATM cell is identified, the address of the beginning of the ATM cell in the data buffer is stored in a read address pointer. The ATM cell may then be dispatched from the data buffer according to the read address pointer. As in the general case, the read address pointer is not allowed to breach a wrapping boundary comprising the data buffer.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

As network speeds increase, power dissipation and chip yield become important concerns when designing and manufacturing network interface devices. The faster an interface device operates the more power it consumes. Also, faster devices require tighter tolerances in their dynamic performance. This is directly related to chip yield in that some physical devices may not meet high-speed performance specifications. The present invention is a method and apparatus for receiving network data using a single data buffer. The invention manipulates the single data buffer using a state machine to perform Layer 1 framing and Layer 2 delineation in a tightly coupled manner. By eliminating a second buffer that has historically been required to perform Layer 2 delineation, significant power saving is achieved. Higher semiconductor die yield is also achieved because a finished network interface die comprises substantially fewer features than prior devices.

An example of an extremely fast network structure is Asynchronous Transfer Mode (ATM). ATM transfers data using data cells comprising 53 bytes. Of these 53 bytes, 5 are overhead and comprise circuit connection information. These are collectively called the cell header. One of the overhead bytes carried in the cell is a header error check (HEC) byte. Although one embodiment of the present invention may be tailored to support construction of ATM cells from an arriving bit stream, the scope of the present invention is not limited to such ATM applications. The teachings of the present invention apply equally to any communication system employing framing and delineation for supporting layered communication models.

Figure 1:
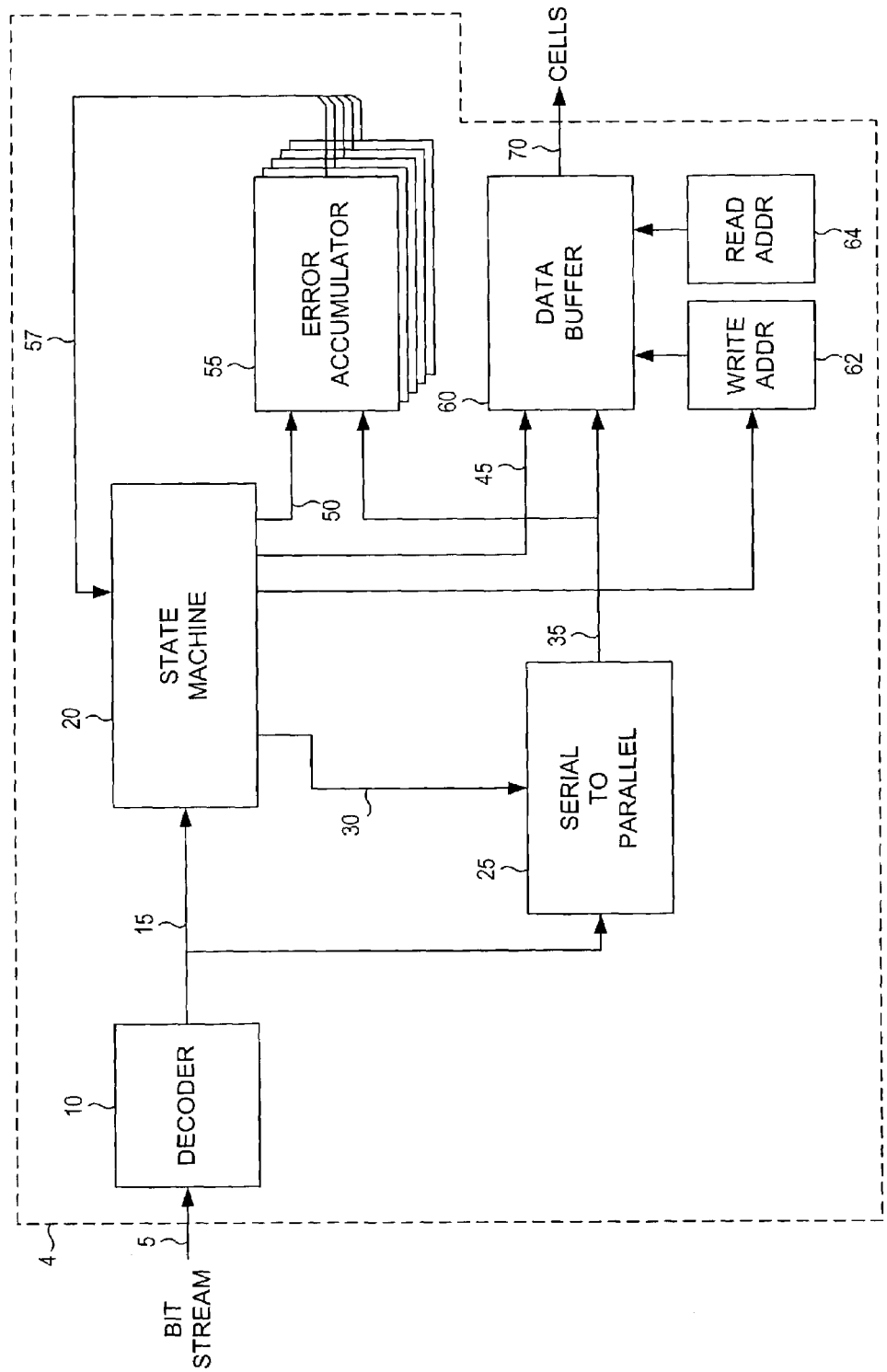
FIG. 1 is a block diagram of one illustrative embodiment of a data-unit extractor according to the present invention.

FIG. 1 is a block diagram of one illustrative embodiment of a data-unit extractor 4 according to the present invention. In some embodiments, a data-unit extractor may comprise a decoder 10. It should be noted that the decoder 10 is an optional component of the data-unit extractor 4 in this example embodiment. In those embodiments that comprise a decoder 10, an encoded bit stream 5 arrives at the decoder 10. The decoder 10 decodes the bit stream 5 according to one of many various encoding formats. Typical encoding formats may include, but are not necessarily limited to non-return to zero, return to zero, Manchester, bi-phase and encoded symbol formats such as 4B/5B. Again, the scope of the present invention is not limited to any particular type of encoding scheme that may be used to propagate a bitstream 5 across a network medium, but can be used with any type of encoding scheme.

According to this illustrative embodiment of a data-unit extractor 4, a state machine 20 receives a decoded bitstream 15 from the decoder 10. This state machine 20 searchs the incoming bitstream 15 in order to recognize the beginning of a frame of data. In those example embodiments of the present invention that are tailored to extract ATM cells from a bitstream, it may be important to note that ATM cells may be carried by lower-level frames comprising a T1/E1 connection.

In one illustrative embodiment of a system for propagating ATM cells, ATM cells may be fragmented into a plurality of smaller data carrying elements called frames. A frame may comprise a collection of bytes propagated across a T1 connection using a time-domain-multiplexing (TDM) scheme. It should be noted that the physical composition of any connection carrying TDM frames is not intended to limit the scope of the present invention. In one alternative embodiment, TDM frames carrying fragmented ATM cells may be conveyed across a Synchronous Optical Network (SONET).

The data-unit extractor 4 may further comprise a serial to parallel converter 25. The state machine 20, upon detecting the beginning of a frame or other subunit of data may issue a start of frame signal 30 to the serial to parallel converter 25. In one example of embodiment, the serial to parallel converter 25 may be further controlled by the state machine 20 to accumulate a particular number of bits from the decoded bitstream 15. In one illustrative example of embodiments, the state machine 20 causes the serial to parallel converter 25 to collect eight bits of incoming serial data 15 to form a parallel byte 35.

According to one example of embodiment of a data-unit extractor, the state machine 20 may further control a data buffer 60. The state machine 20 typically generates a write signal 45 that causes the data buffer 60 to receive the parallel byte 35. The state machine 20 may also initiate a write pointer 62. In this illustrative embodiment, the write pointer 62 is incremented as subsequent data bytes 35 are generated by the serial to parallel converter 25.

The beginning of a data unit may not necessarily be coincident with the beginning of a subunit of data. This concept may be illustrated by the fact that an ATM cell may be fragmented into a plurality of TDM frames. As data begins to arrive as a serial bitstream 5, the first frame received may or may not be the first frame of a fragmented ATM cell. The data-unit extractor of the present invention may use one of several methods to identify the first frame of a fragmented ATM cell.

One method that may be used to identify the beginning of an ATM cell is ATM cell header recognition. In order to recognize an ATM cell header, the state machine 20 may cause bytes of data from the serial to parallel converter 35 to be stored in an error accumulator 55. Once five bytes have been received from the serial to parallel converter 25 under direction of the state machine 20, the next byte emanating from the serial to parallel converter 25 is presumed to be an error check byte for the header. This header error check value is also propagated to the error accumulator 55 for comparison with an error check value based on the five previously received bytes and generated by the error accumulator 55. If a match occurs, the error accumulator 55 issues a cell-start signal 57 to the state machine 20. In response to this signal, the state machine 20 typically causes the address stored in the write pointer 62 used for accumulating subunit of data in the data buffer 60 into a read address pointer 64. Because the header of an ATM cell is five bytes long, five distinct error accumulators are required to ensure recognition of the start of an ATM cell.

In one alternative embodiment of the present invention, the beginning of a data unit such as an ATM cell may be accomplished by recognizing a start indicator in the arriving bitstream 5. In one alternative embodiment, the start indicator may comprise an illegal or unused bit-encoding symbol. Once the start indicator is recognized by the state machine 20, the contents of the write pointer 62 may be stored into the read address pointer 64.

After the beginning of an ATM cell is recognized by the state machine 20, the state machine 20 will cause the data buffer 60 to receive additional data bytes from the serial to parallel converter 25 in order to assemble a complete ATM cell in the data buffer 60. Once a complete ATM cell is stored in the data buffer 60, it may be extracted from the data buffer according to the read address pointer 64 and directed 70 to higher levels of the protocol stack.

Figure 2:
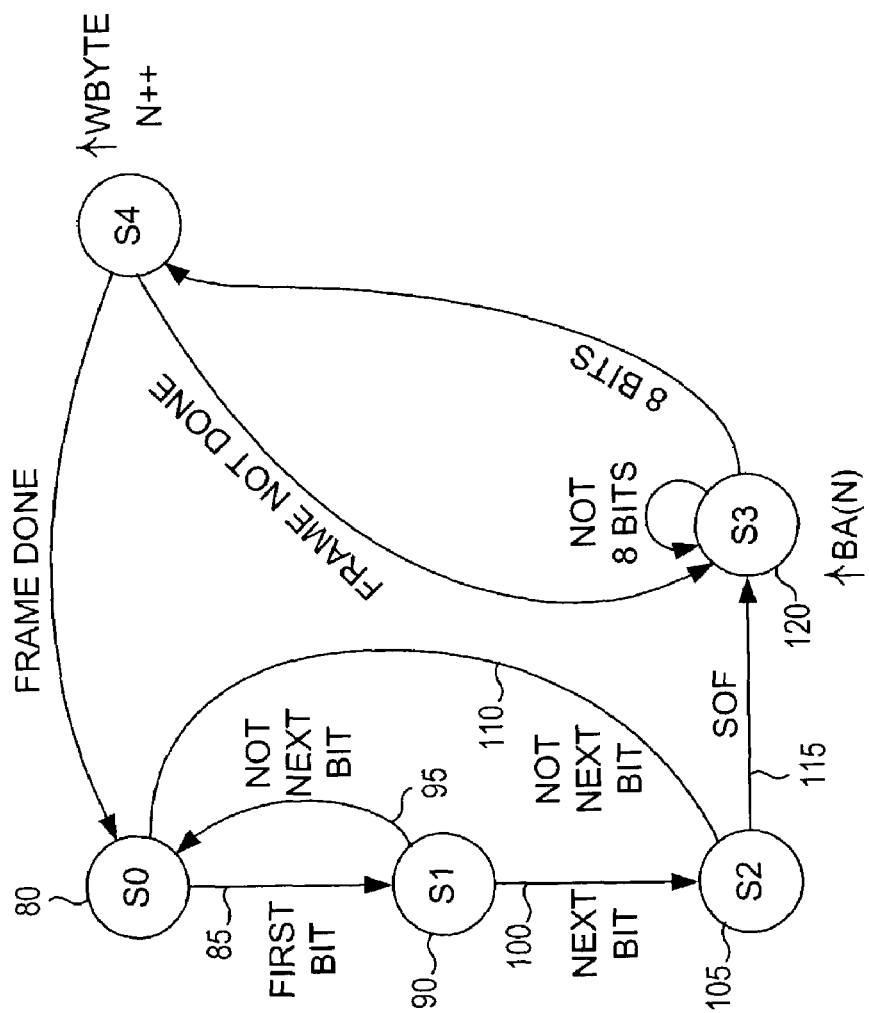
FIG. 2 is a state flow diagram that depicts the operation of one illustrative embodiment of a state machine configured according to the present invention to receive data bytes into a data buffer.

FIG. 2 is a state flow diagram that depicts the operation of one illustrative embodiment of a state machine 20 configured according to the present invention to receive data bytes into a data buffer 60. According to this illustrative embodiment, the state machine begins in initial state (S0) 80. In this initial state 80, the state machine looks for the first bit in a start of frame (SOF) sequence. If the state machine finds this first bit 85, it will transition to another state (S1) 90 and wait for the next bit of the SOF sequence. If it fails to find the next bit 95, the state machine typically transitions back to the initial state 80. If the state machine does find the next subsequent bit of the SOF sequence 100, it will transition to another state (S2) 105 and wait for the next bit in the SOF sequence. Failure to recognize the next bit 110 typically causes the state machine to return to the initial state 80. In this example embodiment, a limited number of states are presented for recognizing a start of frame sequence. It should be noted that additional states may be introduced into the state flow to accommodate longer SOF bit sequences.

Once a start of frame is detected 115, the state machine transitions to an accumulation state (S3) 120 wherein it accumulates a predetermined number of bits to form a subunit of data. In this illustrative embodiment, the state machine accumulates eight bits to form parallel bytes. Once eight bits have been accumulated, the state machine moves to a storage state (S4) where it activates a write signal that may cause the data byte to be stored in a data buffer. The state machine may use an external byte counter to track the number of bytes remaining in a frame. If a frame is done, the state machine migrates back to the initial state 80. Otherwise, additional 8-bit bytes are accumulated and written into the data buffer.

Figure 3:
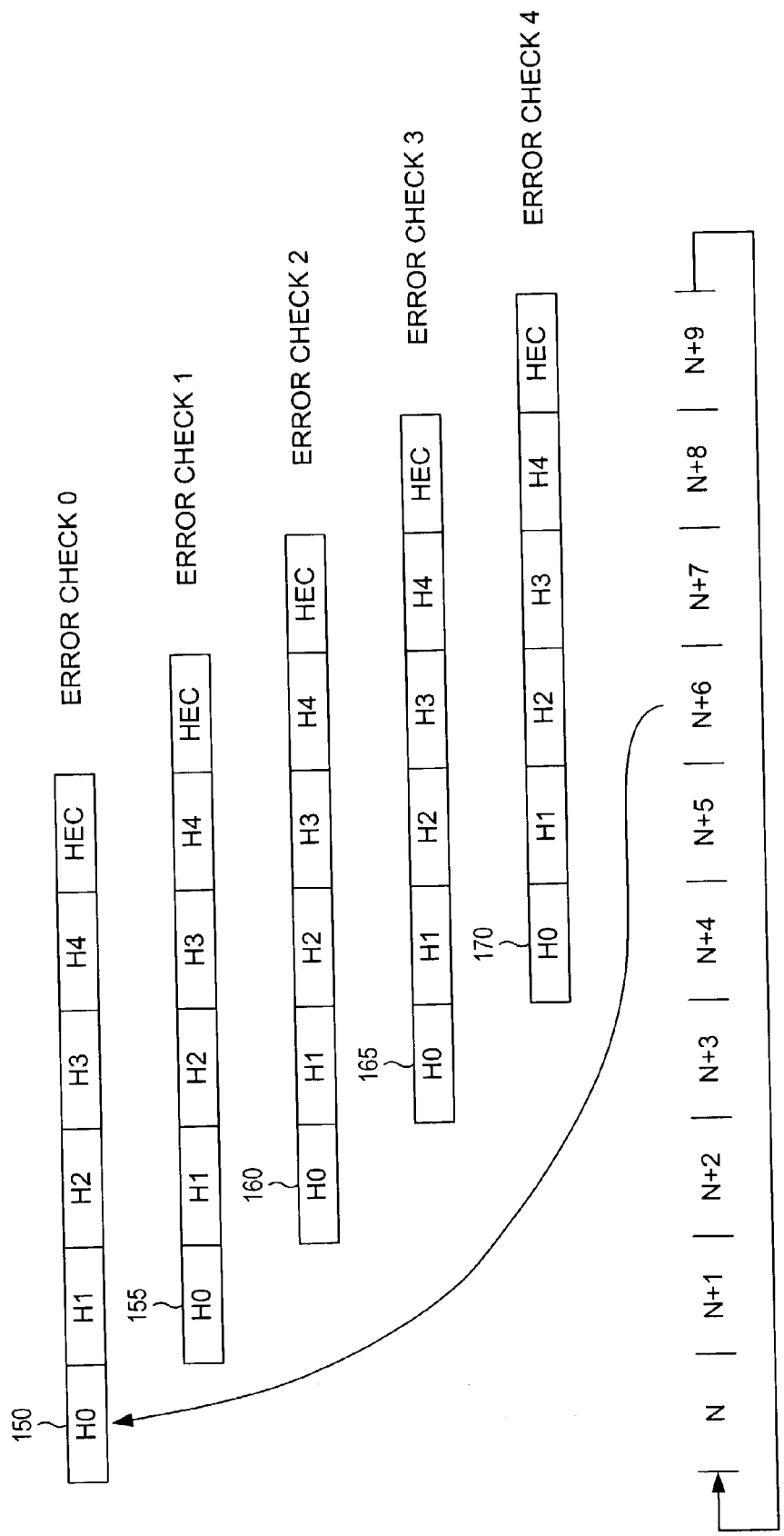
FIG. 3 is a pictorial illustration that depicts the use of parallel error accumulators to recognize a data unit header according to one illustrative embodiment of the present invention.

FIG. 3 is a pictorial illustration that depicts the use of parallel error accumulators to recognize a data unit header according to one illustrative embodiment of the present invention. In some embodiments of the present invention, the data-unit extractor may be configured to receive ATM cells. As already introduced, one method for identifying the beginning of an ATM cell comprises identification of the cell header. According to one embodiment of the present invention, subunits of data may comprise bytes and may arrive in sequential bytes times (N, N+1, N+2, and so forth). In a specific embodiment of the present invention tailored to receive ATM cells, five error code values may be generated wherein each error code value is staggered from its previous counterpart by one byte-time.

Referring to the figure, in a first byte time "N" a first byte, or data subunit is directed to the first error code generator 150. In a second byte time "N+1", a second byte is directed as the second byte to the first error code generator 150 and to the second error code generator 155 as a first byte for that error code generator. This staggering continues for each error code generator until a sixth byte time "N+5" when the first error code generator 150 receives an error code check value from the incoming bitstream and makes a comparison of the received error code check value to the generated error code. The first error code generator 150 will then clear the error code it generated and accept a new set of five bytes, or data subunits in byte time "N+6".

Figure 4:
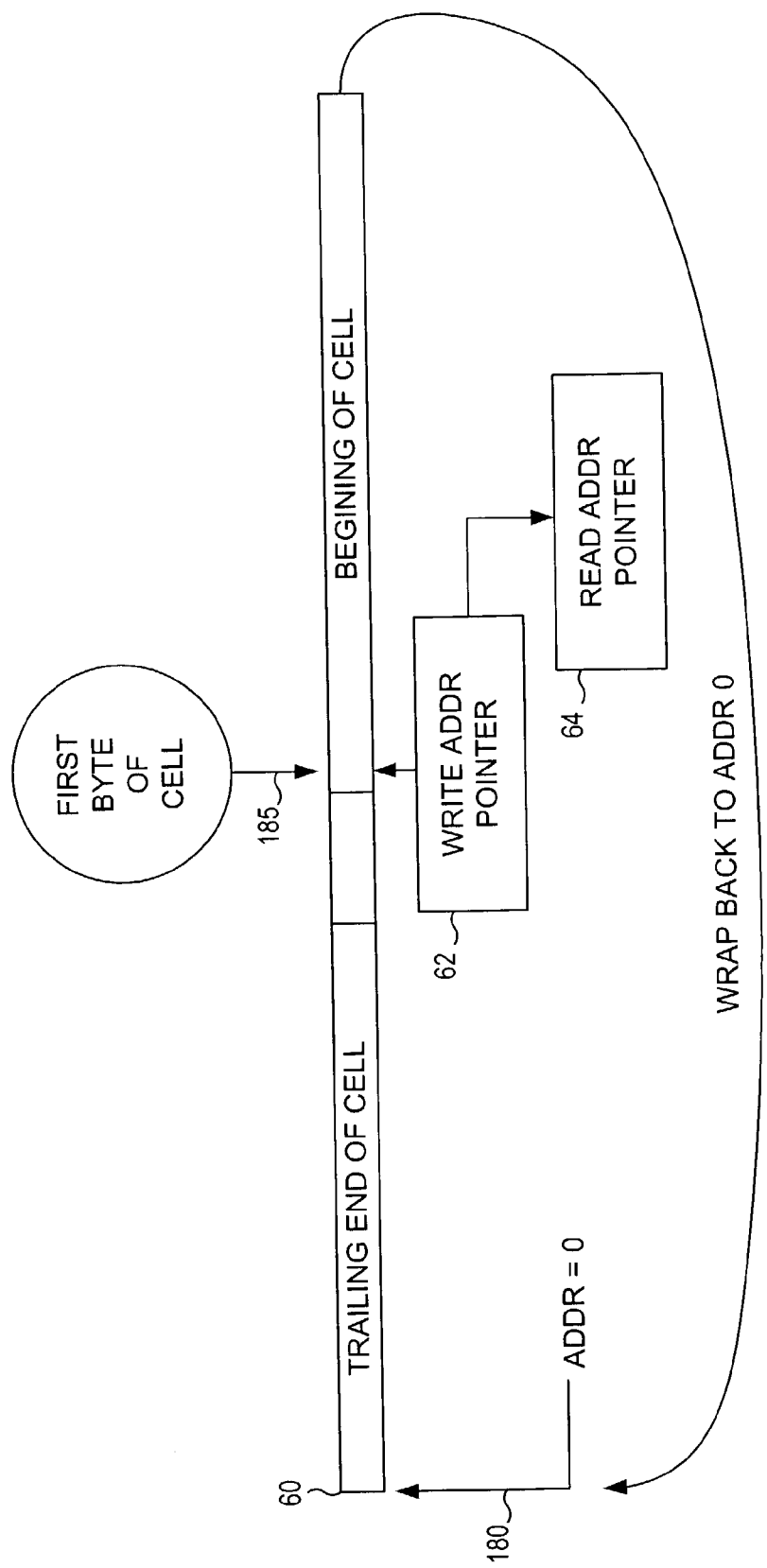
FIG. 4 is a pictorial representation of a circular buffer that enables combined framing and delineation of data units according to one illustrative embodiment of the present invention.

FIG. 4 is a pictorial representation of a circular buffer that enables combined framing and delineation of data units according to one illustrative embodiment of the present invention. As subunits of data arrive and are stored in a data buffer 60, the first subunit of data may not be the first fragment of a larger data unit that it partly comprises. In one example embodiment of the present invention, bytes received from incoming frames by way of a TDM interface may be part of an ATM cell. These are stored successively in memory at the beginning of the buffer 180.

As bytes continue to accumulate in the data buffer, they may represent the trailing end of an ATM cell. Eventually, the first byte of an ATM cell will be stored in the buffer 60, but this may not be stored at the beginning of the buffer 185. Once the beginning of the ATM cell or other major data unit is recognized, the value of the write pointer 62 may be transferred into the read pointer 64. It should be noted that the value of the write pointer may need to be decremented by a value of five where ATM cell identification is accomplished by header recognition described supra. The value stored in the read pointer 64 represents the beginning address of a major data unit offset from the base of the data buffer 60.

As bytes of a major data unit continue to be stored in the data buffer 60, there may be insufficient room in the end portion of the data buffer 60. The write pointer 62 will continue to advance until it reaches beyond a wrapping boundary 190 comprising the data buffer 60. At that point, the write pointer 62 will be reset to point to the beginning of the data buffer 60. This same wrapping process is applicable to the read pointer 64 as subunits of data are extracted from the data buffer 60 in order to transmit a major data unit such as an ATM cell. It should be noted that the invention is applicable to framing and delineation of any major data unit type and that the use of an ATM cell is for illustrative purposes only.

Figure 5:
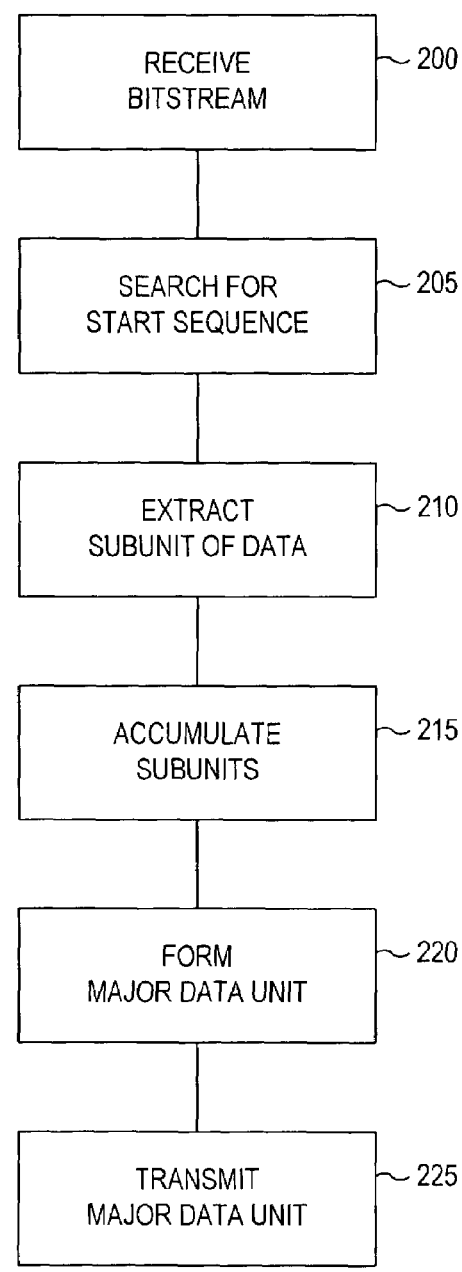
FIG. 5 is flow diagram that depicts one illustrative method for receiving a data stream and extracting delineated major data units.

FIG. 5 is flow diagram that depicts one illustrative method for receiving a data stream and extracting delineated major data units. According to this illustrative method, a bitstream may be received (step 200). The present method provides that the bitstream be searched for a start sequence (step 205). Once a start sequence has been identified, subunits of data may be extracted from the bitstream (step 210). As subunits of data arrive, they may be accumulated in a data buffer (step 215). Once all of the subunits of a major data unit have been accumulated, they may be formed into a major data unit (step 220). The present method then provides that the major data unit may be conveyed to an end-user (step 225).

Receiving a bitstream (step 200) may be accomplished in one of several manners. In one example embodiment, the bitstream may arrive in an encoded form. The encoded bitstream may need to be decoded so that it may be processed further. Once the bitstream is decoded, it may be searched for a start sequence. In one alternative embodiment, the method may rely on a specific form of encoding in the bitstream to identify the beginning of a subunit of data. One example of this comprises 4B/5B encoding. This 4B/5B encoding method may provide for the use of a particular encoding symbol that represents the beginning of a subunit of data. In 4B/5B encoding, four data bits may be encoded into a symbol comprising five bits. Some of the symbols may then be used for overhead purposes such as identification of the beginning of a frame or other subunit of data.

In yet another alternative embodiment of the present method, the beginning of a subunit of data may be identified by searching for a start sequence directly in the bitstream. According to the method of the present invention, this may be accomplished in a state machine wherein the state machine transitions from a current state to index state if it recognizes a particular bit in the start sequence. In such embodiments of this method, the state machine may embody a distinct state for each bit of the start sequence and may transition sequentially through these states in order to identify that start sequence. If at any state in the recognition process the digital value of the incoming bit does not correspond to the digital bit value corresponding to that state in the state machine, recognition of the start sequence fails and the state machine returns to an initial state wherein it begins to search for the first bit in the start sequence.

According to this illustrative method, a state machine may be used to accumulate a predetermined number of bits to form a subunit of data. The state machine may then cause this subunit of data to be stored in a buffer. The state machine may store subunits of data in a buffer by first initializing a write address pointer. The subunits of data may then be stored in the data buffer according to an address stored in the write address pointer. As subunits of data continue to arrive, the write address pointer is typically incremented so long as it does not point beyond a wrapping boundary comprising the data buffer. If the end of the data buffer is reached, the write address pointer is typically reset to point to the beginning of the data buffer.

According to one example method of the present invention, the beginning of a major unit of data must be recognized. This may be done in several ways. According to one alternative method of the present invention, a multi-bit encoded symbol that represents the beginning of a major data unit may be recognized by a state machine. Upon detecting the beginning of a major data unit, the state machine may cause an offset value to be stored. This offset value indicates the address of the major data unit relative to the base address of the data buffer.

In at least one embodiment of the present method, the beginning of a major data unit may be identified by recognizing a header within the major data unit. The method of the present invention may be applied to the reception of ATM cells that comprise a five-byte header. In this case, the five-byte header is immediately followed by an error check value. In order to recognize the header, one alternative method according to the present invention generates an error code based on the five-byte header and compares this to the error check value received from the incoming bitstream. If the comparison is positive, the method of the present invention stores the offset value to indicate the beginning of the major data unit within the data buffer.

According to one example method, a major data unit may be extracted from the data buffer of once its location within the data buffer has been identified. Accordingly, a read address pointer may be used to to extract subunits of data from the data buffer in order to deliver a complete major data unit. In one example embodiment of this method, the read address pointer is incremented until it reaches the end of the data buffer. This is typically regarded as a wrapping boundary. Once the read address pointer reaches the wrapping boundary, it is reset causing it to point to the beginning of the data buffer where the remainder of the major data unit may be found.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

What is claimed is:

1. A method for receiving delineated frames comprising the steps of:
   receiving a stream of bits:
   searching said stream of bits for a start sequence:
   extracting a subunit of data from said bit stream once the start sequence is recognized;
   accumulating subunits of data into a data buffer to form a data unit in said data buffer; and
   transmitting said data unit from said data buffer by:
      addressing said data buffer with an offset address that represents the location of the first data subunit of the data unit; and
      if the number of data subunits retrieved from said data buffer is less than that required to form a data unit:
         retrieving a data subunit from the addressed location in the data buffer;
         incrementing the addressed location if the next addressed location is not beyond a wrapping boundary comprising the data buffer; and
         setting the addressed location to the beginning of the data buffer if the next addressed location is beyond the wrapping boundary.

2. The method of claim 1 wherein the step of receiving bits from an interface comprises the steps of:
   receiving an encoded bit stream from an interface; and
   decoding the encoded bit stream to form a non-encoded bit stream.

3. The method of claim 1 wherein the step of searching for a start sequence in said bit stream comprises the steps of:
   searching for a bit in a sequence; and
   searching for a subsequent bit in the sequence if the bit is found.

4. The method of claim 1 wherein the step of accumulating subunits of data into a data buffer comprises the steps of:
   accumulating a predetermined number of bits; and
   storing said accumulation of bits as a subunit of data in a memory location comprising said data buffer.

5. The method of claim 4 wherein the step of storing said accumulation of bits as a subunit of data comprises the steps of:
   storing the accumulation of bits in memory comprising the data buffer at a location pointed to by a write address pointer;
   incrementing the write address pointer if the incremented value of the write address pointer does not point past a wrap boundary comprising the data buffer; and
   resetting the write address pointer if the incremented value of the address pointer points past the wrap boundary.

6. The method of claim 4 further comprising the steps of:
   generating an error code from a predetermined number of subunits of data successively stored in said data buffer;
   receiving an error code check value; and
   storing an offset address corresponding to the beginning of a major data unit formed from subunits of data if said generated error code matches said error code check value.

7. The method of claim 4 further comprises the steps of:
   receiving a multi-bit encoded symbol; and
   storing an offset address that represents the address wherein a subunit of data is stored if said multi-bit encoded symbol is indicative of the start of a major data unit.

8. A data-unit extractor comprising:
   an interface that receives a signal and generates a bitstream therefrom;
   a state machine that:
      receives the bitstream from the interface;
      searches for a start of frame sequence; and
      issues an acquire signal for successive subunits of data after the start of frame sequence is recognized;
   a serial to parallel converter that receives the bitstream from the interface and forms subunits of data at the direction of the acquire signal;
   a data buffer that receives subunits of data from the serial to parallel converter wherein the state machine further generates a write signal that causes the data buffer to store said subunits of data; and
   wherein the state machine further generates control signals to transmit a data unit from the data buffer after said data unit is assembled in the data buffer from said subunits of data by:
      addressing said data buffer with an offset address that represents the location of the first data subunit of the data unit; and
      if the number of data subunits retrieved from said data buffer is less than that required to form a data unit;
         retrieving a data subunit from the addressed location in the data buffer;
         incrementing the addressed location if the next addressed location is not beyond a wrapping boundary comprising the data buffer; and
         setting the addressed location to the beginning of the data buffer if the next addressed location is beyond the wrapping boundary.

9. The data-unit extractor of claim 8 wherein the interface comprises a decoder that accepts an encoded serial bitstream and generates a non-encoded bit stream.

10. The data-unit extractor of claim 8 wherein the state machine searches for a start of frame sequence by:
    transitioning from a current state to a next state wherein the state machine is ready to recognize a subsequent bit in the start sequence if the state of the bit stream in the current state represents a bit in the start sequence corresponding to said current state; and
    moving to a state wherein it is ready to recognize the first bit in the start sequence if a bit received in the state machine does not represent a bit in the start sequence corresponding to the current state of the state machine.

11. The data-unit extractor of claim 8 wherein the state machine generates the acquire signal and the write signal by:
    enabling the acquire signal in order to cause the serial to parallel converter to acquire a predetermined number of bits as a subunit of data; and
    enabling the write signal after the predetermined number of bits have been acquired by the serial to parallel converter.

12. The data-unit extractor of claim 11 wherein the state machine further:
    enables a write address pointer to define the storage location within said data buffer that will accept the subunit of data; and
    after the subunit of data has been stored in the data buffer:
       increments the write address pointer if the incremented write address pointer will not point past a wrap boundary comprising the data buffer; and
       sets the write address pointer to the beginning of the data buffer if the incremented memory address pointer will point past the wrap boundary.

13. The data-unit extractor of claim 11 further comprising an error accumulator that generates a match signal if an error code value that it generates based on a predetermined number of subunits of data that it receives matches an error check value that it receives and wherein the state machine further:
    directs the predetermined number of subunits of data to said error accumulator;
    directs the error code check value to said error accumulator; and
    causes the value in a write address pointer to be stored in a read address pointer if it receives a match signal from the error accumulator.

14. The data-unit extractor of claim 11 wherein the state machine further:
    receives a multi-bit encoded symbol; and
    causes the value in a write address pointer to be stored in a read address pointer if the multi-bit encoded signal indicates the beginning of a unit of data.

15. An ATM cell extractor comprising:
    interface that receives an ATM signal and generates a bitstream therefrom;
    state machine that:
       receives the bitstream from the interface;
       searches for a start of frame sequence; and
       issues an acquire signal for successive subunits of data after the start of frame sequence is recognized;
    serial to parallel converter that receives the bitstream from the interface and forms subunits of data at the direction of the acquire signal;
    data buffer that receives subunits of data from the serial to parallel converter wherein the state machine further generates a write signal that causes the data buffer to stores said subunits of data; and
    wherein the state machine further generates control signals to transmit an ATM cell from the data buffer after said cell is assembled in the data buffer from said subunits of data by:
       addressing said data buffer with an offset address that represents the location of the first data subunit of the data unit; and if the number of data subunits retrieved from said data buffer is less than that required to form a data unit;

retrieving a data subunit from the addressed location in the data butter;

incrementing the addressed location if the next addressed location is not beyond a wrapping boundary comprising the data buffer; and setting the addressed location to the beginning of the data buffer if the next addressed location is beyond the wrapping boundary.

16. The ATM cell extractor of claim 15 wherein the state machine further:

enables a write address pointer to define the storage location within said data buffer that will accept the subunit of data; and after the subunit of data has been stored in the data buffer:

increments the write address pointer if the incremented write address pointer will not point past a wrap boundary comprising the data buffer; and sets the write address pointer to the beginning of the data buffer if the incremented write address pointer will point past the wrap boundary.

17. The ATM cell extractor of claim 16 further comprising an error accumulator that generates a match signal if an error code value that it generates based on an ATM cell header that it receives matches an ATM header error check value that it receives and wherein the state machine further:

directs subunits of data comprising the ATM cell header to said error accumulator;

directs the ATM cell header error code check value to said error accumulator; and causes the value in the write address pointer to be stored in a read address pointer if it receives a match signal from the error accumulator.

18. The ATM cell extractor of claim 16 wherein the state machine further:

receives a multi-bit encoded symbol; and causes the value in the write address pointer to be stored in a read address pointer if the multi-bit encoded signal indicates the beginning of an ATM cell.

* * * * *